(12) United States Patent
Tanaka et al.

(10) Patent No.: US 8,502,940 B2
(45) Date of Patent: Aug. 6, 2013

(54) LIQUID CRYSTAL DISPLAY APPARATUS COMPRISING A PLURALITY OF PIXEL BOUNDARY AREAS THAT VARY FOR DIFFERENT COLOR PIXELS AND OVERALL PIXEL ELECTRODE CONDUCTIVE AREAS THAT ARE EQUAL FOR EACH PIXEL

(75) Inventors: Hironao Tanaka, Kanagawa (JP); Hidemasa Yamaguchi, Kanagawa (JP); Yoshihiro Sakurai, Kanagawa (JP)

(73) Assignee: Japan Display West, Inc., Chita (JP)

( * ) Notice: Subject to any disclaimer, the term of this patent is extended or adjusted under 35 U.S.C. 154(b) by 992 days.

(21) Appl. No.: 12/247,851

(22) Filed: Oct. 8, 2008

(65) Prior Publication Data
US 2009/0109358 A1    Apr. 30, 2009

(30) Foreign Application Priority Data

Oct. 31, 2007  (JP) ................... 2007-283160

(51) Int. Cl.
G02F 1/1335    (2006.01)
G02F 1/1343    (2006.01)

(52) U.S. Cl.
USPC .......................................... 349/109; 349/142

(58) Field of Classification Search
USPC ................... 349/142–144, 106–109, 141
See application file for complete search history.

(56) References Cited

U.S. PATENT DOCUMENTS

| | | | |
|---|---|---|---|
| 6,496,170 B1 * | 12/2002 | Yoshida et al. | 345/87 |
| 2005/0253994 A1 * | 11/2005 | Kamijima et al. | 349/155 |
| 2006/0262262 A1 * | 11/2006 | Kim et al. | 349/139 |

FOREIGN PATENT DOCUMENTS

| | | |
|---|---|---|
| JP | 11-014978 | 1/1999 |
| JP | 2003-091017 | 3/2003 |

* cited by examiner

Primary Examiner — Paul Lee
(74) Attorney, Agent, or Firm — Robert J. Depke; The Chicago Technology Law Group, LLC

(57) ABSTRACT

Disclosed herein is a display apparatus including a first substrate patterned to create pixel electrodes, a second substrate placed to face the first substrate and a liquid-crystal layer sandwiched by the first and second substrates wherein: one of the first and second substrates is patterned to create color filters each provided for one of a plurality of different colors as color filters each associated with one of the pixel electrodes each included in one of pixels each provided for one of the different colors; each of the pixels each provided for one of the different colors has a pixel area which varies from color to color; and the ratio of the electrode area of any particular one of the pixel electrodes to the pixel area of the pixel that includes the particular pixel electrode varies from color to color.

13 Claims, 11 Drawing Sheets

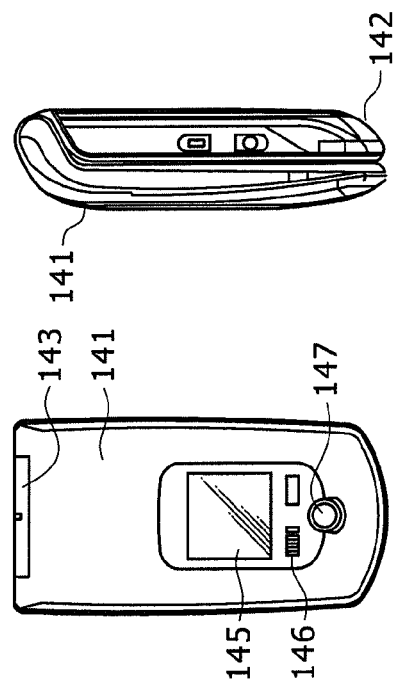
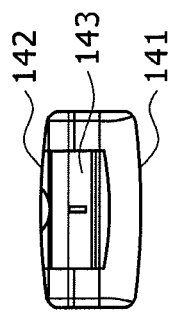
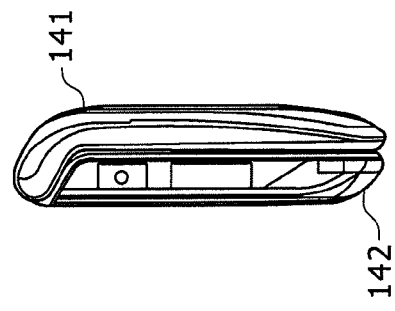
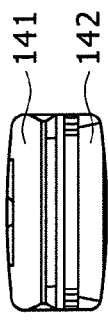
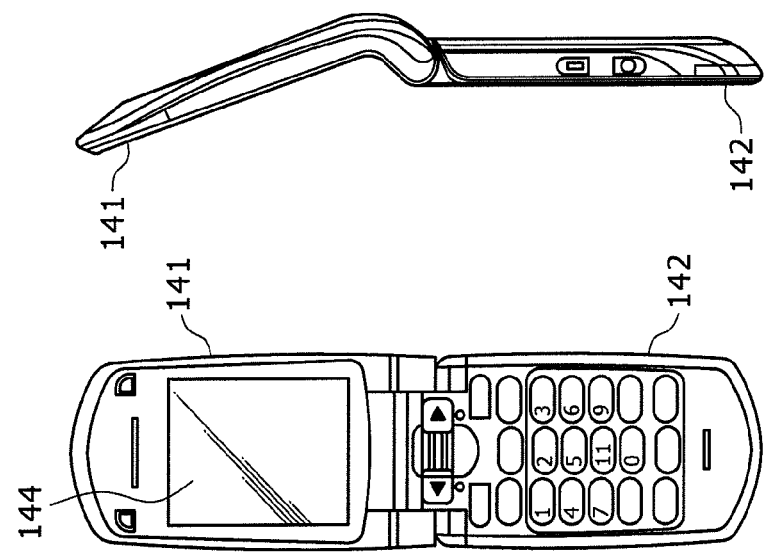

B-B'

LIQUID CRYSTAL DISPLAY APPARATUS COMPRISING A PLURALITY OF PIXEL BOUNDARY AREAS THAT VARY FOR DIFFERENT COLOR PIXELS AND OVERALL PIXEL ELECTRODE CONDUCTIVE AREAS THAT ARE EQUAL FOR EACH PIXEL

CROSS REFERENCES TO RELATED APPLICATIONS

The present invention contains subject matter related to Japanese Patent Application JP 2007-283160 filed in the Japan Patent Office on Oct. 31, 2007, the entire contents of which being incorporated herein by reference.

BACKGROUND OF THE INVENTION

1. Field of the Invention

In general, the present invention relates to a display apparatus. In particular, the present invention relates a display apparatus for driving liquid-crystal molecules in an FFS (Fringe Field Switching) mode.

2. Description of the Related Art

In the field of liquid-crystal display apparatus operating in a horizontal electric-field mode, attention is paid to a liquid-crystal mode for implementing a large visual field angle and high contrast. In particular, in comparison with an IPS (In-Plane Switching) mode, the FFS (Fringe Field Switching) mode provides an improved aperture ratio and an improved transmission.

FIG. 12 is a plurality of diagrams each showing a typical liquid-crystal display apparatus operating in the FFS mode. To be more specific, FIG. 12A is a diagram showing a top view of principal components employed in the liquid-crystal display apparatus whereas FIG. 12B is a cross-sectional diagram showing a B-B' cross section of the top-view diagram of FIG. 12A. As shown in the diagrams of FIG. 12, the typical liquid-crystal display apparatus operating in the FFS mode includes a first substrate 201 provided on a driving side, a plurality of scan lines 202 each oriented in a horizontal direction and a common line 202c oriented in a direction parallel to the scan lines 202. The scan lines 202 and the common line 202c are created on the first substrate 201. In addition, a common electrode 203 made of a transparent conductive film is provided over a wide range in a state of being connected to the common line 202c.

The scan lines 202, the common line 202c and the common electrode 203 are covered by a gate insulation film 204 which is shown only in the cross-sectional diagram of FIG. 12B. A semiconductor layer 205 is provided on the gate insulation film 204 in a state of overlapping the upper portion of the scan lines 202. A plurality of signal lines 206 are extended on the common electrode 203 in a direction intersecting the scan lines 202. A pixel exists at an intersection of each of the signal lines 206 and each of the scan lines 202. A source electrode 206s is provided on the semiconductor layer 205 from the signal line 206 with the edge of the source electrode 206s overlapping the upper portion of the semiconductor layer 205. By the same token, a drain electrode 206d is provided on the semiconductor layer 205 with the edge of the drain electrode 206d overlapping the upper portion of the semiconductor layer 205. The drain electrode 206d is provided at a location facing the source electrode 206s to form a thin-film transistor Tr in conjunction with the source electrode 206s.

The signal lines 206 and the thin-film transistor Tr are covered by an interlayer insulation film 207. Each pixel on the interlayer insulation film 207 is provided with a pixel electrode 208 connected to the thin-film transistor Tr through a connection hole 207a made by drilling the interlayer insulation film 207. The pixel electrode 208 includes a plurality of electrode members 208a each extended in a direction parallel to the signal lines 206 (or the scan lines 202) to form a pattern having a shape like the so-called comb teeth. An orientation film 209 is provided in a state of covering the pixel electrode 208. In the configuration described above, a signal storage capacitor C for storing a pixel voltage is created for each pixel as a capacitor connected between the pixel electrode 208 and the common electrode 203.

On a forming side the pixel electrode 208 with respect to the first substrate 201 provided on the driving side to be described later, on the other hand, a second substrate 301 shown only in the cross-sectional diagram of FIG. 12B is provided to face the first substrate 201. The second substrate 301 is made from an optically transparent material. On a face facing the pixel electrode 208, the second substrate 301 is provided with a color-filter layer 303 patterned to create color filters for different colors such as the read (R), green (G) and blue (B) colors each associated with a pixel. An orientation film 305 is created in a state of covering the color-filter layer 303. Between the orientation films 209 and 305 of the two substrates 201 and 301 respectively, the liquid crystal layer LC mentioned above is provided along with a spacer which is not shown in the diagrams of FIG. 12. On the outer side of the first substrate 201, a light polarization plate 41 is provided and, on the outer side of the second substrate 301, a light polarization plate 43 is provided to complete a liquid-crystal display apparatus.

In the liquid-crystal display apparatus having such a configuration and operating in the FFS mode, a video signal written from a signal line 206 by way of the thin-film transistor Tr is applied to the pixel electrode 208 and stored in the signal storage capacitor C provided between the pixel electrode 208 and the common electrode 203. Then, a difference in electric potential between the pixel electrode 208 and the common electrode 203 generates an electric field parallel to the first substrate 201. The electric field drives liquid-crystal molecules m to carry out an optical modulation process.

For the liquid-crystal display apparatus operating in the FFS mode as described above, there has been also proposed a configuration in which the common line 202c and the common electrode 203 are provided between the gate insulation film 204 and the interlayer insulation film 207 as is disclosed in Japanese Patent No. 3,742,836. In particular, the reader is suggested to refer to FIGS. 3 to 6 and paragraphs related to these figures.

As a technique to improve the quality of pictures displayed by the liquid-crystal display apparatus, it is important to raise the transmission. In general, in order to raise the transmission of the liquid-crystal display apparatus, it is necessary to optimize a retardation ($\Delta nd$) to a value in a certain range. As is commonly known, the retardation ($\Delta nd$) is determined by the product of the refraction-index anisotropy ($\Delta n$) of the liquid-crystal material and the cell gap (d). That is to say, in the typical liquid-crystal display apparatus shown in the diagrams of FIG. 12, the transmission at a white-display time is increased by adjusting the distance between the first substrate 201 provided on the driving side and the second substrate 301 provided on the opposite side or adjusting the refraction-index anisotropy through selection of liquid-crystal molecules m composing the liquid-crystal layer LC.

FIG. 13 is a diagram showing a transmission spectrum for a liquid-crystal cell section including no color filters for every retardation. The liquid-crystal cell section of a liquid-crystal display apparatus is a section including polarization plates and the liquid-crystal layer. FIG. 14 is a diagram showing a relation between the retardation (Δnd) obtained from the transmission spectra shown in the diagram of FIG. 13 as the white-display retardation (Δnd) of the liquid-crystal layer and the transmission as well as a relation between the retardation (Δnd) and the color temperature at a white display time. As is obvious from the diagram of FIG. 13, the larger the white-display retardation (Δnd) of the liquid-crystal layer, the more the wavelength range corresponding to high transmissions is shifted to the side of the large values of wavelength (or the right side of the horizontal axis). However, each of the relations shown in the diagram of FIG. 14 as the relation between the retardation (Δnd) of the liquid-crystal layer and the transmission as well as the relation between the retardation (Δnd) and the color temperature is a relation peculiar to the transmission spectra which are unique to an optical design carried out by taking color filters and other components into consideration as the optical design of the liquid-crystal layer. Thus, for a retardation (Δnd) range corresponding to highest values of the transmission of the liquid-crystal layer, a white display of the desired color temperature is not necessarily obtained. In the typical relations shown in the diagram of FIG. 14, for a retardation (Δnd) range corresponding to highest values of the transmission of the liquid-crystal layer, the color temperature is about 7,000 K.

In order to obtain a desired white display for a higher color temperature, it is possible to conceive a configuration allowing the pixel area of every pixel (that is, the pixel area of each of pixels for the red, green and blue colors) serving as one display unit to be adjusted so as to make the pixel area of the pixel for the red color smaller than the pixel areas of the pixels for the green and blue colors. By providing such a configuration, it is possible to sustain the color reproducibility while decreasing the transmission of the red color in a white display without changing the chromaticity of each of the red, green and blue colors. It is thus possible to raise the color temperature of a white display showing a display in red, green and blue colors at the same time and obtain a desired white display.

SUMMARY OF THE INVENTION

In the FFS mode described above, however, a signal storage capacitor C for storing a pixel voltage is provided between the pixel electrode and the common electrode. Thus, in a structure allowing the pixel area of the pixel for the red color to be made to smaller than the pixel areas of the pixels for the green and blue colors as described above, the capacitance of the signal storage capacitor C employed in a pixel for the red color is smaller than the capacitance of the signal storage capacitor C employed in a pixel for the green color and the capacitance of the signal storage capacitor C employed in a pixel for the blue color. As a result, there are differences among pixel electric potentials applied to the pixel electrodes employed in pixels for the red, green and blue colors.

That is to say, the pixel electric potential written into the pixel electrodes through a signal line is shifted by operations to turn the thin-film transistors on and off by changing electric potentials applied to the gate electrodes of the thin-film transistors. Eq. (1) given below expresses the distance by which the pixel electric potential written into the pixel electrodes through a signal line is shifted. The distance by which the pixel electric potential written into the pixel electrodes through a signal line is shifted is referred to as a drop-down voltage ΔVp.

[Eq. 1]

$$\Delta Vp = (Cgd/(Cs + C_{LC} + Cgd))(VgL - VgH) \quad (1)$$

where a variety of notations used in the above equation denote a variety of quantities as follows:

ΔVp denotes the drop-down voltage of the electric potential of the pixel.

Cs denotes the capacitance of the signal storage capacitor C.

$C_{LC}$ denotes the liquid-crystal capacitance of the pixel.

Cgd denotes the parasitic capacitance between the pixel electrode and the gate electrode.

VgL denotes the lowest electric potential appearing on the gate electrode.

VgH denotes the highest electric potential appearing on the gate electrode.

In a structure allowing the pixel area of every pixel (that is, the pixel area of each of pixels for the red, green and blue colors) serving as one display unit to be adjusted as described above so as to adjust the transmission of each of the pixels for the red, green and blue colors, the pixel area of each of the pixels for the red, green and blue colors is varied so that the capacitance of the signal storage capacitor C created between the pixel electrode and the common electrode also changes as well. Thus, there are differences in drop-down voltage ΔVp among pixel electric potentials in the pixels for the red, green and blue colors. That is to say, there are undesirable variations among pixel electric potentials in the pixels for the red, green and blue colors.

Such variations in pixel electric potential from pixel to pixel in turn cause variations in VT characteristic, flickers as well as residual-image and burn-in characteristics from pixel to pixel, giving rise to deterioration of the display quality.

Addressing the problems described above, inventors of the present invention provide a liquid-crystal display apparatus capable of controlling a white-display color temperature while assuring characteristic uniformity among pixels for a variety of color displays.

The liquid-crystal display apparatus provided by the present invention employs a first substrate patterned to create pixel electrodes, a second substrate placed to face the first substrate and a liquid-crystal layer sandwiched by the first and second substrates. In addition, one of the first and second substrates is patterned to create color filters each provided for one of a plurality of different colors as color filters each associated with one of the pixel electrodes each included in one of pixels provided for the different colors. On top of that, in particular, each of the pixels each provided for one of the different colors has a pixel area which varies from color to color. Thus, in the liquid-crystal display apparatus, the ratio of the electrode area of any particular one of the pixel electrodes to the pixel area of one of the pixel that includes the particular pixel electrode varies from color to color.

In the liquid-crystal display apparatus having such a configuration, each of pixels each provided for one of the different colors has a pixel area which varies from color to color. Thus, the color tone of a display can be controlled by setting the pixel area. That is to say, if pixels are provided for three colors, i.e., the red, green and blue colors for example, it is possible to control the color temperature in a white display in a state of showing a display in red, green and blue colors at the same time. On top of that, in particular, the liquid-crystal display apparatus has a configuration in which the ratio of the electrode area of the pixel electrode to the pixel area of a pixel provided for one of the different colors as a pixel including the pixel electrode varies from color to color. Thus, for example, if the pixel electrode serves as one electrode of a signal storage capacitor of the pixel circuit, the capacitance of the capacitor can be controlled independently of the pixel area. As an example, by fixing the electrode area of the pixel electrode, the capacitance of the signal storage capacitor can be fixed so that pixels each provided for one of different colors can be driven independently of the pixel area without variations.

As described above, in accordance with the present invention, a liquid-crystal display apparatus for showing color displays is capable of controlling the color tone of a display while controlling uniformly of pixels each provided for one of different colors. As a result, for example, the liquid-crystal display apparatus is capable of controlling the color temperature in a white display while sustaining the display quality by assuring characteristic uniformity among the pixels provided for a variety of color displays.

BRIEF DESCRIPTION OF THE DRAWINGS

These and other features of the present invention will become clear from the following description of the preferred embodiments given with reference to the accompanying diagrams, in which:

FIG. 8A is a diagram showing a squint view of the external appearance of the digital camera seen from a position on the front side of the digital camera, and FIG. 8B is a diagram showing a squint view of the external appearance of the digital camera seen from a position on the rear side of the digital camera;

FIGS. 11A to 11G show the external appearances of a portable terminal such as a cellular phone to which an embodiment of the present invention is applied, FIG. 11A is a diagram showing the front view of the cellular phone in a state of being already opened, FIG. 11B is a diagram showing a side of the cellular phone in a state of being already opened, FIG. 11C is a diagram showing the front view of the cellular phone in a state of being already closed, FIG. 11D is a diagram showing the left side of the cellular phone in a state of being already closed, FIG. 11E is a diagram showing the right side of the cellular phone in a state of being already closed, FIG. 11F is a diagram showing the top view of the cellular phone in a state of being already closed, and FIG. 11G is a diagram showing the bottom view of the cellular phone in a state of being already closed;

FIG. 12A is a diagram showing a top view of principal components employed in the liquid-crystal display apparatus, and FIG. 12B is a cross-sectional diagram showing a B-B' cross section of the top-view diagram of FIG. 12A;

PREFERRED EMBODIMENTS OF THE PRESENT INVENTION

Preferred embodiments of the present invention are explained by referring to diagrams as follows.
<First Embodiment>

Figure 1:
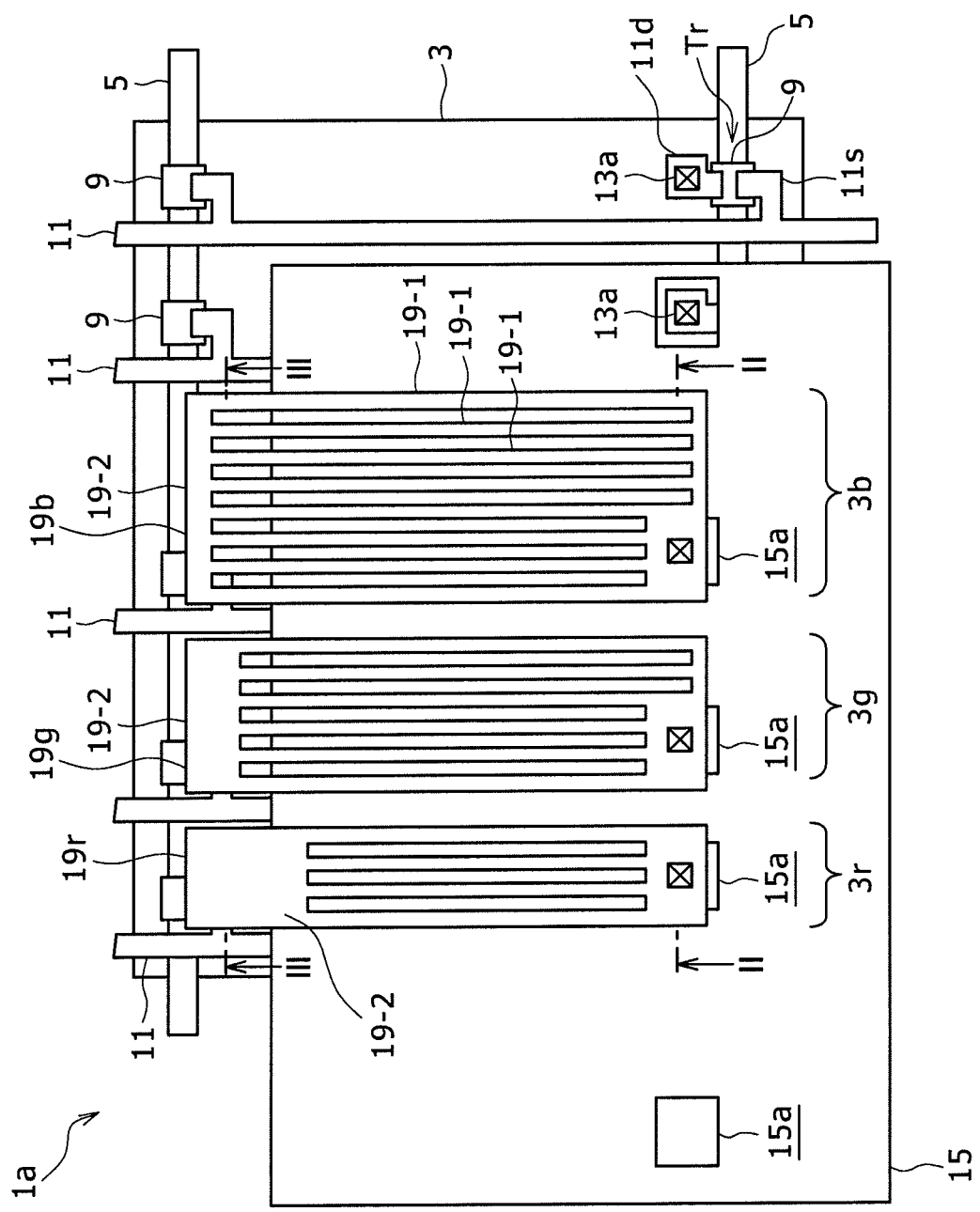
FIG. 1 is an explanatory diagram to be referred to in description of the configuration of a liquid-crystal display apparatus according to a first embodiment of the present invention as a diagram showing a top view of a driving-substrate model of the liquid-crystal display apparatus.
Figure 2:
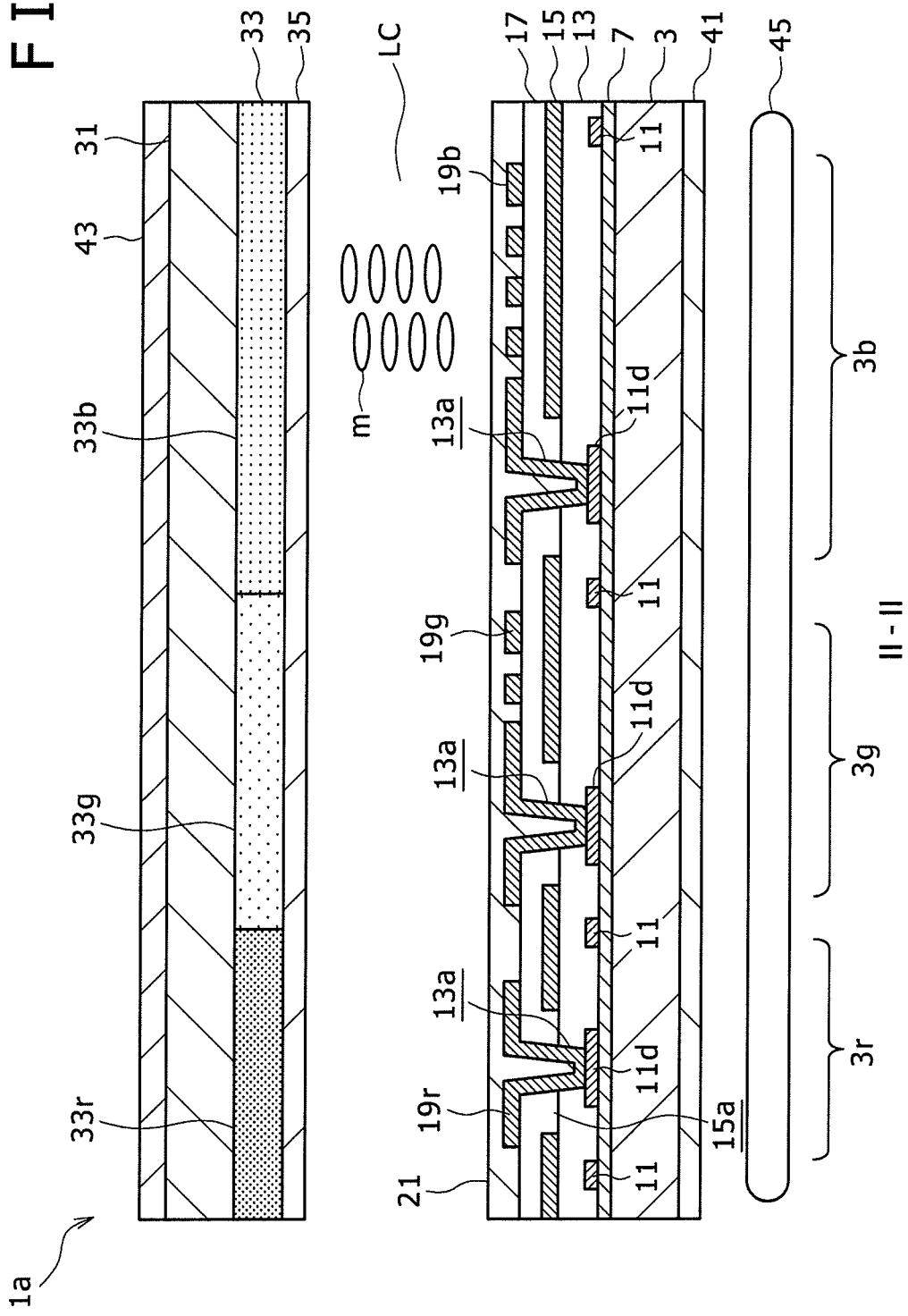
FIG. 2 is a cross-sectional diagram showing a II-II cross section shown in the top-view diagram of FIG. 1.
Figure 3:
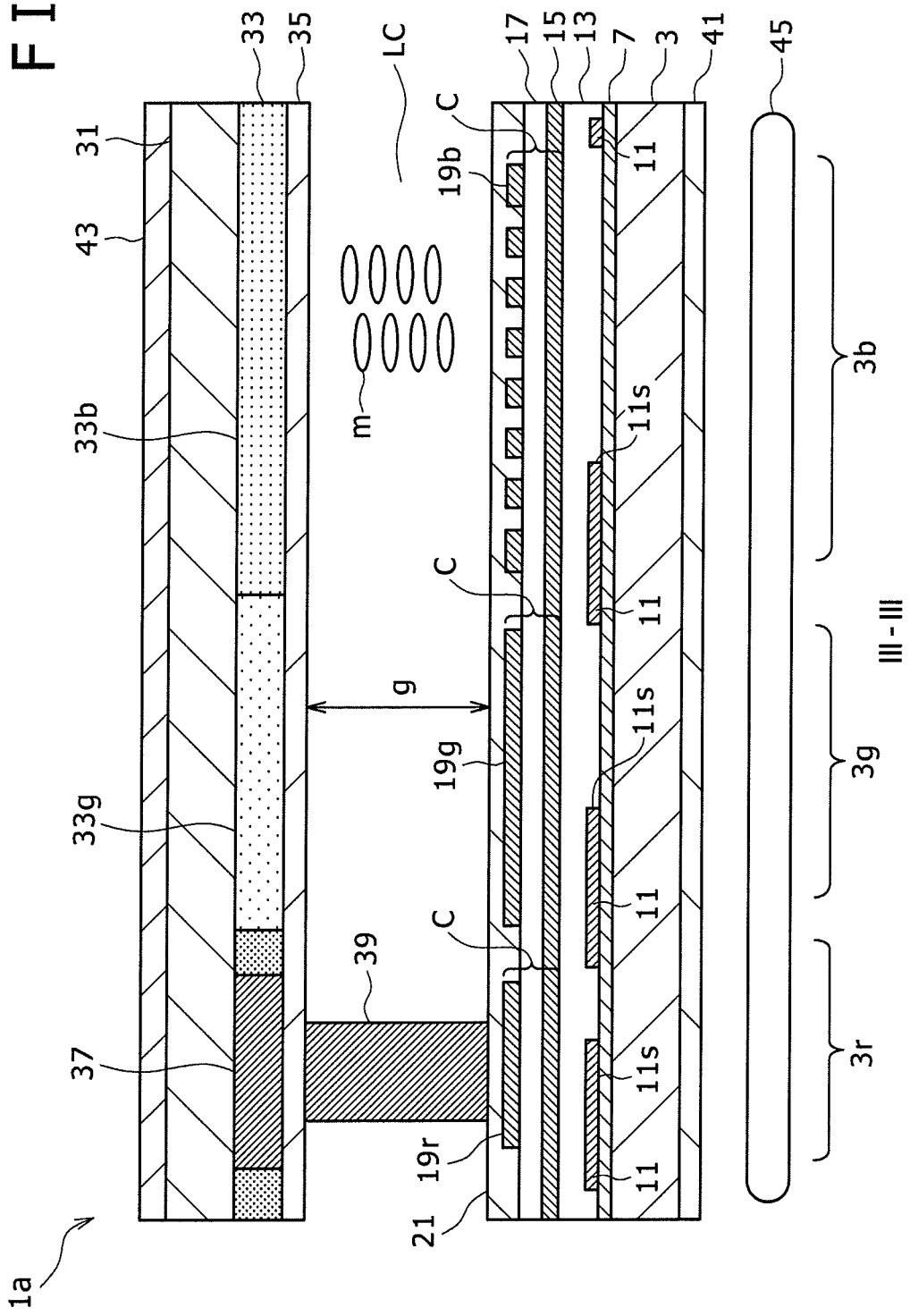
FIG. 3 is a cross-sectional diagram showing a III-III cross section shown in the top-view diagram of FIG. 1.

FIG. 1 is an explanatory diagram referred to in description of the configuration of a liquid-crystal display apparatus 1a according to a first embodiment of the present invention as a diagram showing a top view of a driving-substrate model of the liquid-crystal display apparatus. FIG. 2 is a cross-sectional diagram showing a II-II cross section shown in the top-view diagram of FIG. 1. FIG. 3 is a cross-sectional diagram showing a III-III cross section shown in the top-view diagram of FIG. 1. Each of FIGS. 1 to 3 is a diagram showing three pixels, i.e., a red-color pixel $3r$, a green-color pixel $3g$ and a blue-color pixel $3b$ which form a set of color pixels in the liquid-crystal display apparatus $1a$ according to the first embodiment of the present invention. It is to be noted that the top-view diagram of FIG. 1 does not show some configuration elements such as insulation and orientation films.

The liquid-crystal display apparatus $1a$ shown in the top-view diagram of FIG. 1, the cross-sectional diagram of FIG. 2 and the cross-sectional diagram of FIG. 3 is a liquid-crystal display apparatus operating in the FFS mode. A plurality of scan lines 5 shown only in the top-view diagram of FIG. 1 are laid out on a first substrate 3 having an optical transparency characteristic for visible light. In addition, a gate insulation film 7 is provided on the first substrate 3 in a state of covering the scan lines 5.

Semiconductor layers 9 shown only in the top-view diagram of FIG. 1 are created to form a pattern on the gate insulation film 7 at locations overlapping the scan lines 5. In addition, on the gate insulation film 7, a plurality of signal lines 11 are created in the vertical direction, crossing the scan lines 5. For every three intersections of the scan lines 5 and the signal lines 11, a red-color pixel $3r$, a green-color pixel $3g$ and a blue-color pixel $3b$ are created. Each of the semiconductor layers 9 forming a pattern as described above is provided for one of the red-color pixel $3r$, the green-color pixel $3g$ and the blue-color pixel $3b$.

In the present invention, the red-color pixel $3r$, the green-color pixel $3g$ and the blue-color pixel $3b$ are configured to have pixel areas different from each other. Let us assume that the red-color pixel $3r$, the green-color pixel $3g$ and the blue-color pixel $3b$ have pixel areas Sr, Sg and Sb respectively. In this case, the ratios Sr:Sg:Sb are set to match a white display demanded in the liquid-crystal display apparatus 1a.

In the case of the first embodiment for example, the red-color pixel 3r, the green-color pixel 3g and the blue-color pixel 3b are configured so that the larger the wavelength of light of emitted by a pixel, the smaller the area of the pixel. Thus, the pixel areas Sr, Sg and Sb of the red-color pixel 3r, the green-color pixel 3g and the blue-color pixel 3b respectively satisfy the following relation Sr<Sg<Sb.

The pixel areas Sr, Sg and Sb of the red-color pixel 3r, the green-color pixel 3g and the blue-color pixel 3b respectively are adjusted by typically changing the gaps between the locations of the signal lines 11.

Each of the red-color pixel 3r, the green-color pixel 3g and the blue-color pixel 3b which are created on the gate insulation film 7 includes a thin-film transistor Tr having a source electrode 11s, a drain electrode 11d and a gate electrode which is a specific one of the scan lines 5. The source electrode 11s and the drain electrode 11d are each stacked on one end of the semiconductor layer 9 in a state of sandwiching the specific scan line 5.

The source electrode 11s and the drain electrode 11d are configured on the same layer as the signal lines 11 with the source electrode 11s serving as an extension of one of the signal lines 11.

In addition, a first insulation film 13 is created on the gate insulation film 7 in a state of covering the thin-film transistor Tr having such a configuration as a first interlayer insulation film. The first insulation film 13 has a flat surface and a thickness capable of reliably assuring insulation between the lower and upper layers sandwiching the first insulation film 13. In this case, the lower layer includes the signal line 11, the source electrode 11s and the drain electrode 11d. The first insulation film 13 is typically an organic insulation film created for example by adopting a spin coat method.

The upper layer on the first insulation film 13 is a common electrode 15 made of a transparent conductive material such as ITO (Indium Tin Oxide) or IZO (Indium Zinc Oxide) as a blanket electrode layer common to all pixels. Thus, in conjunction with the scan lines 5 and the signal lines 11, the common electrode 15 sandwiches the thick first insulation film 13 in a configuration capable of preventing the load capacitances of the scan lines 5 and the signal lines 11 from increasing. In addition, by creating the common electrode 15 as a blanket electrode layer, it is possible to provide a configuration anticipating an improved aperture ratio of the pixels. The common electrode 15 has openings 15a each provided above the drain electrode 11d of a thin-film transistor Tr created for each of the pixels and exposed to the drain electrode 11d.

In addition, a second insulation film 17 is created on the common electrode 15 as a second interlayer insulation film. In order to obtain a good driving characteristic of liquid-crystal molecules m composing a liquid-crystal crystal LC, it is important to create the second insulation film 17 into the shape of a thin film having a uniform thickness.

On the second insulation film 17, pixel electrodes 19r, 19g and 19b are provided for the red-color pixel 3r, the green-color pixel 3g and the blue-color pixel 3b respectively. In addition, in such a configuration, the red-color pixel 3r, the green-color pixel 3g and the blue-color pixel 3b are provided with signal storage capacitors C each placed between the common electrode 15 and the pixel electrodes 19r, 19g and 19b respectively as a capacitor having the second insulation film 17 as the dielectric substance thereof.

In the first embodiment, the pixel electrodes 19r, 19g and 19b are created to form a pattern with approximately equal electrode areas Dr, Dg and Db independently of the pixel areas of the red-color pixel 3r, the green-color pixel 3g and the blue-color pixel 3b. Thus, the ratios of the electrode areas Dr, Dg and Db of the pixel electrodes 19r, 19g and 19b respectively to the pixel areas Sr, Sg and Sb of the red-color pixel 3r, the green-color pixel 3g and the blue-color pixel 3b respectively satisfy the following relations: (Dr/Sr)>(Dg/Sg)>(Db/Sb). In addition, the signal storage capacitors C placed between the common electrode 15 and the pixel electrodes 19r, 19g and 19b as capacitors provided for the red-color pixel 3r, the green-color pixel 3g and the blue-color pixel 3b respectively have approximately equal capacitances.

As shown in the top-view diagram of FIG. 1, each of the pixel electrodes 19r, 19g and 19b is created as a pixel electrode forming a pattern having a shape like the so-called comb teeth. Each of the pixel electrodes 19r, 19g and 19b has a plurality of electrode members 19-1 extended in a direction parallel to the signal lines 11 (or the scan lines 5) and bridge members 19-2. One of the bridge members 19-2 connects the ends of the electrode members 19-1 on one side to each other whereas the other bridge member 19-2 connects the ends of the electrode members 19-1 on the other side to each other. Let us assume for example that, for the pixel electrode 19r associated with the red-color pixel 3r, four electrode members 19-1 are created between two bridge members 19-2 whereas, for the pixel electrode 19g associated with the red-color pixel 3g, six electrode members 19-1 are created between two bridge members 19-2. On the other hand, for the pixel electrode 19b associated with the red-color pixel 3b, eight electrode members 19-1 are created between two bridge members 19-2. In each of the pixel electrodes 19r, 19g and 19b, the pixel electrodes 19r, 19g and 19b form a pattern in which the electrode members 19-1 have a uniform width and a uniform pitch throughout the pixel electrodes 19r, 19g and 19b. In addition, let us also assume that the width w of each of the bridge members 19-2 each connecting electrode members 19-1 in the same pixel electrode to each other is adjusted so that the electrode areas Dr, Dg and Db of the pixel electrodes 19r, 19g and 19b respectively satisfy the following relations: Dr≈Dg≈Db. It is to be noted that the width w of a bridge member 19-2 is the bridge size in a direction in which the electrode members 19-1 connected to each other by the bridge member 19-2 are extended.

Let us also assume that each of the pixel electrodes 19r, 19g and 19b each made of a transparent conductive material such as ITO or IZO is connected to the drain electrode 11d of the thin-film transistor Tr through an opening 15a made by drilling the common electrode 15 and a connection hole 13a made by drilling the second insulation film 17 as well as the first insulation film 13.

Thus, the liquid-crystal display apparatus 1a has a configuration in which, when a thin-film transistor Tr is selected by an electrical signal supplied to the gate electrode of the thin-film transistor Tr through a scan line 5 as an electrical signal for putting the thin-film transistor Tr in a conductive state, a video signal written from a signal line 11 by way of the thin-film transistor Tr is supplied to the pixel electrode 19 and also stored in the signal storage capacitor C provided between the common electrode 15 and the pixel electrode 19.

It is to be noted that, if the liquid-crystal display apparatus 1a has a multi-domain structure, every electrode 19a has a planar shape curved in the middle of a line segment oriented in the extension direction of each electrode 19a in a direction different from the extension direction so that every pixel has a configuration in which each electrode 19a is divided into two areas extended in two different directions. In this case, it is desirable from the aperture-ratio improvement standpoint to also bend the signal line 11 (or the scan line 5) in accordance with the curvature of the electrode 19a.

In addition, an orientation film 21 shown only in the cross-sectional diagrams of FIGS. 2 and 3 is created over the first substrate 3 on which the pixel electrodes 19 are formed. The orientation film 21 is the top layer in the configuration on the first substrate 3 provided on the driving side.

On a forming side the pixel electrodes 19 with respect to the first substrate 3 provided on the driving side, on the other hand, a second substrate 31 shown only in the cross-sectional diagrams of FIGS. 2 and 3 is provided to face the first substrate 3. The second substrate 31 is made from an optically transparent material. On a face facing the pixel electrodes 19, the second substrate 31 is provided with a color-filter layer 33 patterned to create color filters 33r, 33g and 33b for the red-color pixel 3r, the green-color pixel 3g and the blue-color pixel 3b respectively. The color filters 33r, 33g and 33b form such a pattern that the color filters 33r, 33g and 33b are aligned to the red-color pixel 3r, the green-color pixel 3g and the blue-color pixel 3b respectively and the color filters 33r, 33g and 33b have areas about equal to the pixel areas of the red-color pixel 3r, the green-color pixel 3g and the blue-color pixel 3b respectively.

In addition to the color filters 33r, 33g and 33b described above, a light shielding film 37 such as a black matrix is also created on the color-filter layer 33. In particular, the bridge member 19-2 of the pixel electrode 19r of the red-color pixel 3r is created to have a large width as a portion not contributing to a display. Thus, the light shielding film 37 is created as a film associated with the bridge member 19-2 of the pixel electrode 19r of the red-color pixel 3r.

An orientation film 35 is created on the color-filter layer 33 on which the color filters 33r, 33g and 33b as well as the light shielding film 37 are formed. Between the orientation films 21 and 35 of the two substrates 3 and 31 respectively, the liquid crystal layer LC cited above is provided along with a spacer 39 which is shown only in the cross-sectional diagram of FIG. 3.

It is desirable to provide the spacer 39 on the bridge member 19-2 of the red-color pixel electrode 19r for a red-color pixel 3r which does not contribute to a display. In such a configuration, a cell gap g which is the thickness of the liquid-crystal layer LC is adjusted by varying the height of the spacer 39. By considering the refraction-index anisotropy of liquid-crystal molecules m composing the liquid-crystal layer LC, the cell gap g is adjusted and set at such a value that the transmission of the liquid-crystal layer LC is maximized.

It is to be noted that, in the first embodiment, on the basis of the retardation $\Delta$nd, which is determined by the refraction-index anisotropy of liquid-crystal molecules m composing the liquid-crystal layer LC and the cell gap g, the pixel areas Sr, Sg and Sb of the color pixels 3r, 3g and 3b respectively are set at values satisfying the relations Sr<Sg<Sb so as to make the color temperature of an actual display approach that of a desired white color.

In addition, on the outer side of the first substrate 3, a light polarization plate 41 is provided and, on the outer side of the second substrate 31, a light polarization plate 43 is provided whereas, on the outer side of the light polarization plate 41 provided for the first substrate 3, a backlight 45 is created to complete a liquid-crystal display apparatus 1a.

The optical configuration of such a liquid-crystal display apparatus 1a can also be made identical with that of an ordinary liquid-crystal display apparatus operating in the FFS mode.

In addition, in the liquid-crystal display apparatus 1a described above, when a thin-film transistor Tr is selected by an electrical signal supplied to the gate electrode of the thin-film transistor Tr through a scan line 5 as an electrical signal for putting the thin-film transistor Tr in a conductive state, a video signal written from a signal line 11 by way of the thin-film transistor Tr is supplied to the pixel electrode 19 and also stored in the signal storage capacitor C provided between the common electrode 15 and the pixel electrode 19. Thus, a difference in electric potential exists between the common electrode 15 and the pixel electrode 19 and an electric field parallel to the first substrate 3 is generated, driving liquid-crystal molecules m composing the liquid-crystal layer LC so as to carry out an optical modulation process.

In the liquid-crystal display apparatus 1a having the configuration described above, the common electrode 15 is created on the first insulation film 13 for covering pixel circuits each including a thin-film transistor Tr as well as covering each scan line 5 and each signal line 11 which are connected to the pixel circuit whereas the pixel electrode 19 is formed on the second insulation film 17 covering the common electrode 15. It is thus possible to assure layout freedom of the common electrode 15 and the pixel electrode 19. As a result, it is possible to provide a configuration anticipating an improved aperture ratio of the pixels and a better transmission.

In addition, in the liquid-crystal display apparatus 1a having the configuration described above, by considering the refraction-index anisotropy of liquid-crystal molecules m composing the liquid-crystal layer LC, the cell gap g is adjusted and set at such a value that the transmission of the liquid-crystal layer LC is maximized. Thus, the red-color pixel 3r, the green-color pixel 3g and the blue-color pixel 3b are capable of displaying a bright display. On top of that, the larger the wavelength of light of emitted by a pixel, the smaller the pixel area of the pixel. Thus, the pixel areas Sr, Sg and Sb satisfy the following relation Sr<Sg<Sb. As a result, since much light with small wavelengths can be fetched by a white display independently of the retardation $\Delta$nd, which is determined by the refraction-index anisotropy of liquid-crystal molecules m composing the liquid-crystal layer LC and the cell gap g, a white color with a high color temperature can be displayed.

In addition, the pixel electrodes 19r, 19g and 19b of the red-color pixel 3r, the green-color pixel 3g and the blue-color pixel 3b respectively form such a pattern that the pixel electrodes 19r, 19g and 19b have electrode areas approximately equal to each other independently of the pixel areas of the red-color pixel 3r, the green-color pixel 3g and the blue-color pixel 3b. Therefore, the signal storage capacitors C placed between the common electrode 15 and the pixel electrodes 19r, 19g and 19b as capacitors have approximately equal capacitances. Thus, Eq. (1) given below expresses the distance by which the pixel electric potential written into the pixel electrodes through a signal line is shifted. The distance by which the pixel electric potential written into the pixel electrodes through a signal line is shifted is referred to as a drop-down voltage $\Delta$Vp.

[Eq. 1]

$$\Delta Vp = (Cgd/(Cs + C_{LC} + Cgd))(VgL - VgH) \quad (1)$$

where a variety of notations used in the above equation denote a variety of quantities as follows:

$\Delta$Vp denotes the drop-down voltage of the pixel electric potential.

Cs denotes the capacitance of the signal storage capacitor C.

$C_{LC}$ denotes the liquid-crystal capacitance of the pixel.

Cgd denotes the parasitic capacitance between the pixel electrode and the gate electrode.

VgL denotes the lowest electric potential appearing on the gate electrode.

VgH denotes the highest electric potential appearing on the gate electrode.

Accordingly, the actual pixel electric potentials can be made uniform among the red-color pixel 3r, the green-color pixel 3g and the blue-color pixel 3b. As a result, it is possible to avoid generation of characteristic variations caused by different pixel areas.

As a result, without changing the chromaticity of each of the red, green and blue colors, it is possible to sustain the color reproducibility and improve the display quality by assuring the uniformity of the characteristic among the red-color pixel 3r, the green-color pixel 3g and the blue-color pixel 3b while executing control to raise the color temperature of a white-color display.

<Second Embodiment>

Figure 4:
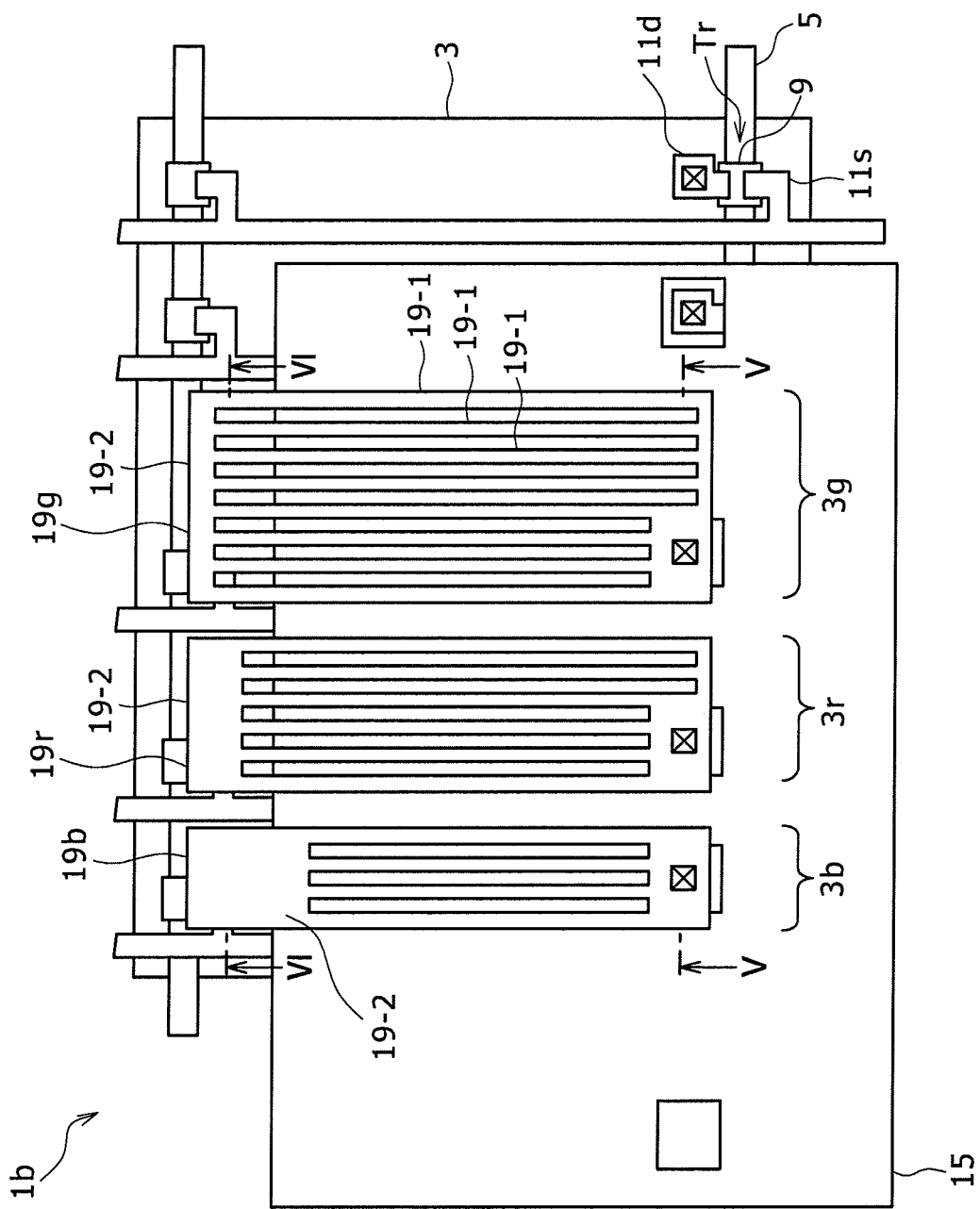
FIG. 4 is an explanatory diagram to be referred to in description of the configuration of a liquid-crystal display apparatus according to a second embodiment of the present invention as a diagram showing a top view of a driving-substrate model of the liquid-crystal display apparatus.
Figure 5:
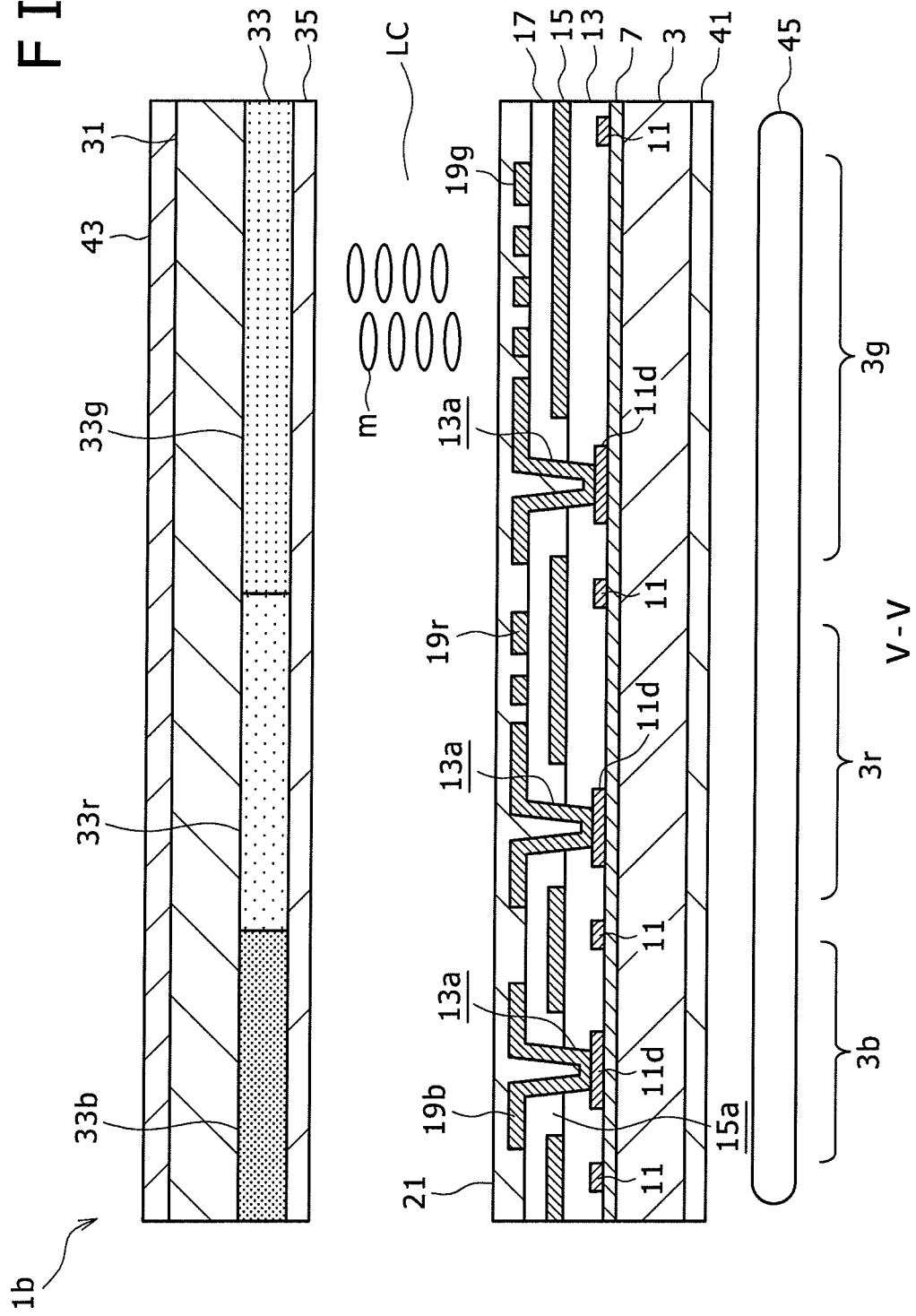
FIG. 5 is a cross-sectional diagram showing a V-V cross section shown in the top-view diagram of FIG. 4.
Figure 6:
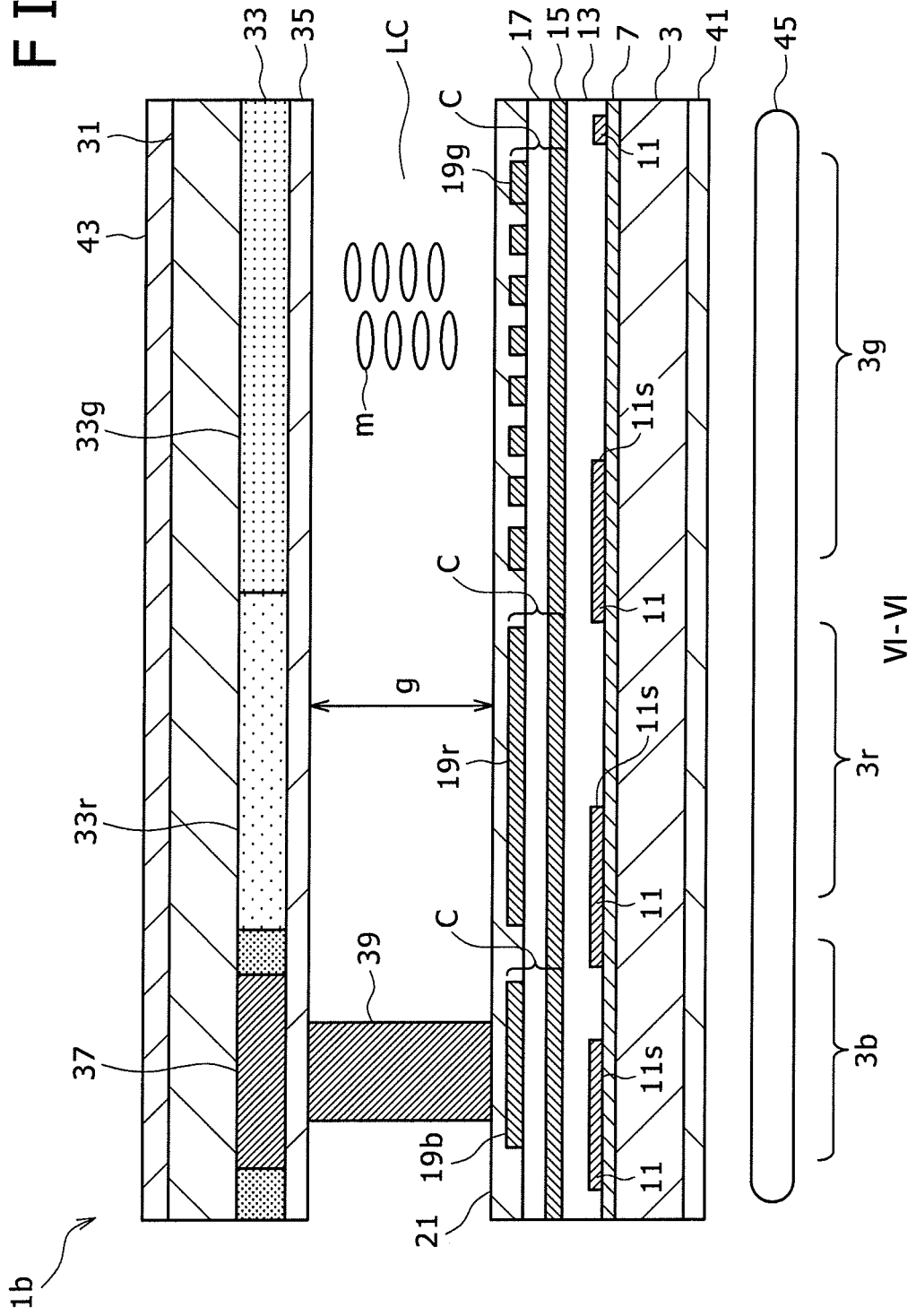
FIG. 6 is a cross-sectional diagram showing a VI-VI cross section shown in the top-view diagram of FIG. 4.

FIG. 4 is an explanatory diagram referred to in description of the configuration of a liquid-crystal display apparatus 1b according to a second embodiment of the present invention as a diagram showing a top view of a driving-substrate model of the liquid-crystal display apparatus. FIG. 5 is a cross-sectional diagram showing a V-V cross section shown in the top-view diagram of FIG. 4. FIG. 6 is a cross-sectional diagram showing a VI-VI cross section shown in the top-view diagram of FIG. 4. Each of FIGS. 4 to 6 is a diagram showing three pixels, i.e., a red-color pixel 3r, a green-color pixel 3g and a blue-color pixel 3b which form a set of color pixels in the liquid-crystal display apparatus 1b according to the second embodiment of the present invention. It is to be noted that the top-view diagram of FIG. 4 does not show some configuration elements such as insulation and orientation films.

The liquid-crystal display apparatus 1b shown in the top-view diagram of FIG. 4 as well as the cross-sectional diagrams of FIGS. 5 and 6 as a display apparatus according to the second embodiment is different from the liquid-crystal display apparatus 1a shown in the top-view diagram of FIG. 1 as well as the cross-sectional diagrams of FIGS. 2 and 3 as a display apparatus according to the first embodiment in that the pixel areas of the red-color pixel 3r, the green-color pixel 3g and the blue-color pixel 3b in the second embodiment are different from those in the first embodiment and, in addition, the allocation of areas in the backlight 45 to the red-color pixel 3r, the green-color pixel 3g and the blue-color pixel 3b is also different from that in the first embodiment.

To put it in detail, the pixel area Sb of the blue-color pixel 3b in the liquid-crystal display apparatus 1b according to the second embodiment is smallest among the pixel areas Sr, Sg and Sb. On the other hand, the pixel area Sg of the green-color pixel 3g associated with the green-color filter 33g having the highest transmission among the red-color filter 33r, the green-color filter 33g and the blue-color filter 33b is largest among the pixel areas Sr, Sg and Sb. That is to say, the pixel areas Sr, Sg and Sb of the red-color pixel 3r, the green-color pixel 3g and the blue-color pixel 3b respectively satisfy the following relation Sb<Sr<Sg.

The pixel areas Sr, Sg and Sb are adjusted by typically changing the gaps between the locations of the signal lines 11 in the same way as the first embodiment.

In addition, much like the first embodiment, the pixel electrodes 19r, 19g and 19b of the red-color pixel 3r, the green-color pixel 3g and the blue-color pixel 3b respectively form such a pattern that the pixel electrodes 19r, 19g and 19b have electrode areas approximately equal to each other independently of the pixel areas of the red-color pixel 3r, the green-color pixel 3g and the blue-color pixel 3b. On top of that, also much like the first embodiment, the signal storage capacitors C placed between the common electrode 15 and the pixel electrodes 19r, 19g and 19b as capacitors provided for the red-color pixel 3r, the green-color pixel 3g and the blue-color pixel 3b respectively have approximately equal capacitances Cs.

Much like the first embodiment, each of the pixel electrodes 19r, 19g and 19b is created as a pixel electrode forming a pattern having a shape like the so-called comb teeth. In addition, also much like the first embodiment, the width w of each of the bridge members 19-2 each connecting electrode members 19-1 in the same pixel electrode to each other is adjusted so that the electrode areas Dr, Dg and Db of the pixel electrodes 19r, 19g and 19b respectively satisfy the following relations: Dr≈Dg≈Db. It is to be noted that the width w of a bridge member 19-2 is the bridge size in a direction in which the electrode members 19-1 connected to each other by the bridge member 19-2 are extended.

In the case of the second embodiment, in particular, the backlight 45 has a higher intensity of light generated in a wavelength area of the blue color than the intensity of light generated in wavelength areas of colors other than the blue color.

As described above, the pixel area Sg of the green-color pixel 3g associated with the green-color filter 33g having the highest transmission among the red-color filter 33r, the green-color filter 33g and the blue-color filter 33b is largest among the pixel areas Sr, Sg and Sb. Thus, a high-transmission display can be obtained. In addition, with the pixel area Sb of the blue-color pixel 3b in the liquid-crystal display apparatus 1b according to the second embodiment set at a value smallest among the pixel areas Sr, Sg and Sb and with the backlight 45 having a higher intensity of light generated in a wavelength area of the blue color than the intensity of light generated in wavelength areas of colors other than the blue color, the light intensity of the blue color can be obtained. Thus, since much light with small wavelengths can be fetched by a white display, a white color with a high color temperature can be displayed.

On top of that, the pixel electrodes 19r, 19g and 19b of the red-color pixel 3r, the green-color pixel 3g and the blue-color pixel 3b respectively form such a pattern that the pixel electrodes 19r, 19g and 19b have electrode areas approximately equal to each other independently of the pixel areas of the red-color pixel 3r, the green-color pixel 3g and the blue-color pixel 3b. Therefore, the signal storage capacitors C placed between the common electrode 15 and the pixel electrodes 19r, 19g and 19b as capacitors have approximately equal capacitances Cs. As a result, it is possible to avoid generation of characteristic variations caused by different pixel areas.

As a result, much like the first embodiment, without changing the chromaticity of each of the red, green and blue colors, it is possible to sustain the color reproducibility and improve the display quality by assuring the uniformity of the characteristic among the red-color pixel 3r, the green-color pixel 3g and the blue-color pixel 3b while executing control to raise the color temperature of a white-color display.

Each of the first and second embodiments described above has a configuration intended to make it possible to improve the display quality by assuring the uniformity of the characteristic among the red-color pixel 3r, the green-color pixel 3g and the blue-color pixel 3b while executing control to raise the color temperature of a white-color display. It is to be noted, however, that the present invention is capable of executing any control of the color temperature by adjusting the pixel areas Sr, Sg and Sb. If it is desired to further lower the color temperature of a white-color display for example, it is necessary to merely set the pixel area Sb of the blue-color pixel 3b at a value smaller than the pixel areas Sr and Sg of the red-color pixel 3r and the green-color pixel 3g respectively.

Figure 12A:
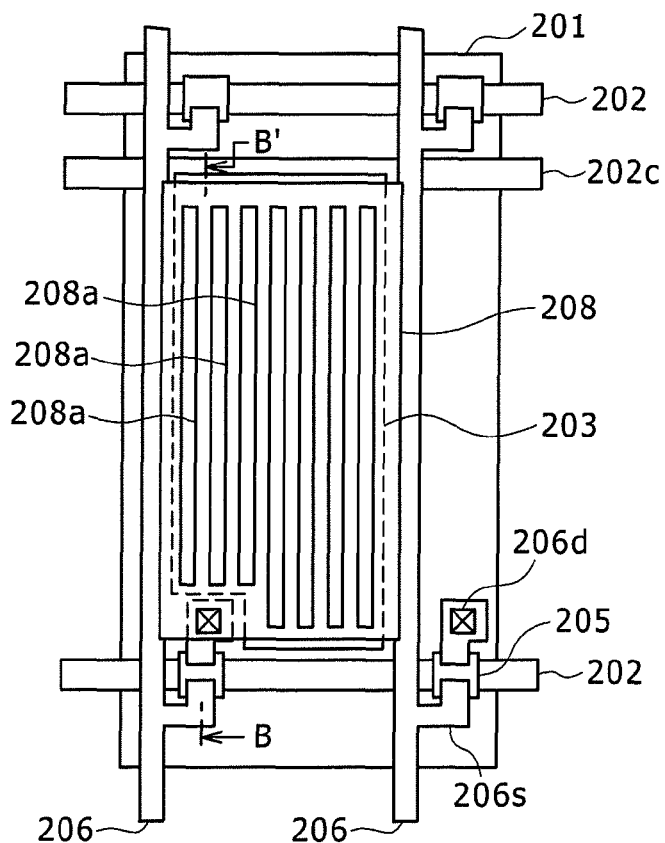
FIGS. 12A and 12B show a typical liquid-crystal display apparatus operating in an FFS (Fringe Field Switching) mode.
Figure 12B:
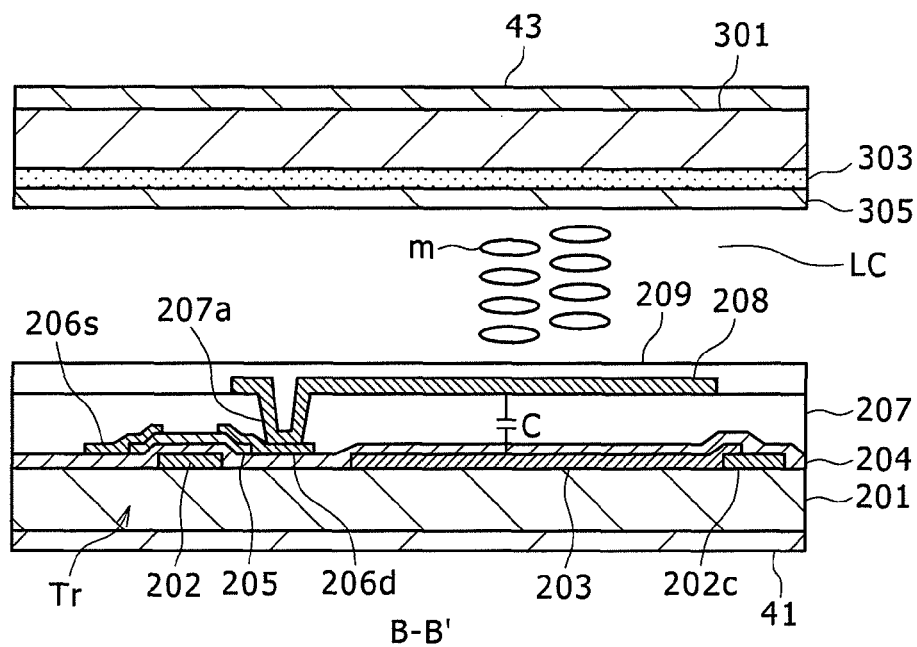
Figure 13:
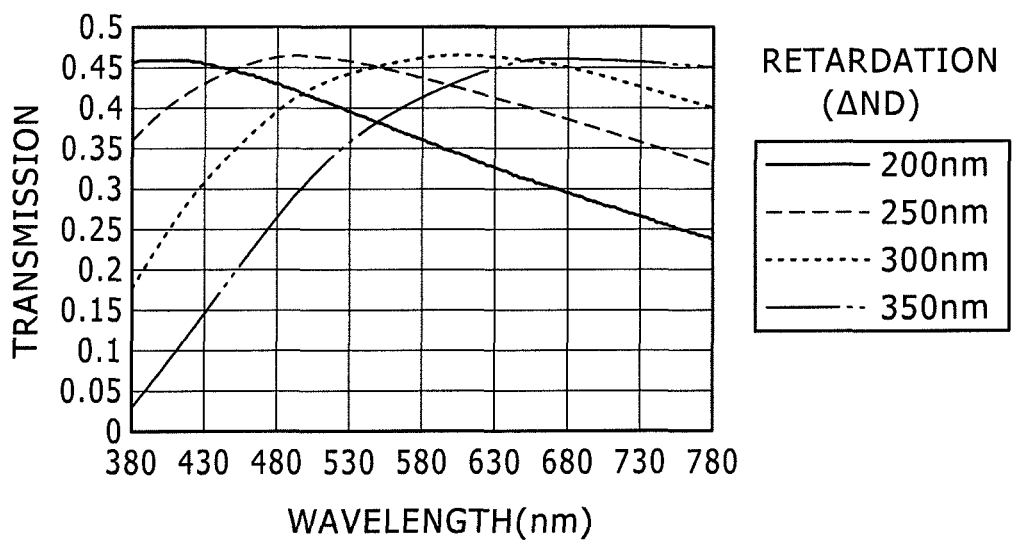
FIG. 13 is a diagram showing a transmission spectrum for a liquid-crystal section including no color filters for every retardation ($\Delta$nd) of a liquid-crystal layer.
Figure 14:
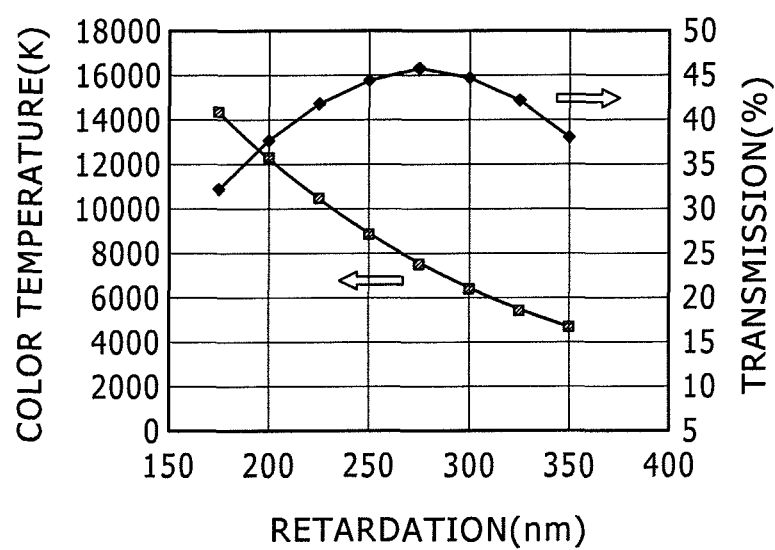
FIG. 14 is a diagram showing a relation between the retardation ($\Delta$nd) of the liquid-crystal layer and the transmission as well as a relation between the retardation ($\Delta$nd) and the color temperature at a white display time.

In the liquid-crystal display apparatus according to the first and second embodiments described above, the common electrode 15 is created on the first insulation film 13 for covering pixel circuits each including a thin-film transistor Tr as well as covering each scan line 5 and each signal line 11 which are connected to the pixel circuit whereas the pixel electrode 19 is formed on the second insulation film 17 covering the common electrode 15. However, the scope of the present invention is by no means limited to these liquid-crystal display apparatus each having such a configuration. For example, the present invention can also be applied to a configuration in which the common electrode is created on the same layer as the pixel circuit including the thin-film transistor Tr like the existing configuration explained previously by referring to the diagrams of FIG. 12. By applying to such a configuration, the same effects as the first and second embodiments can be demonstrated.

In addition, it should be understood by those skilled in the art that a variety of modifications, combinations, sub-combinations and alterations may occur, depending on design requirements and other factors as far as they are within the scope of the appended claims or the equivalents thereof.

APPLICATION EXAMPLES

The liquid-crystal display apparatus according to the embodiment of the present invention described above is typically employed in a variety of electronic instruments shown in diagrams of FIGS. 7 to 11 as instruments used in all fields. Examples of the electronic instruments are a digital camera, a notebook personal computer, a portable terminal such as a cellular phone and a video camera. In each of these electronic instruments, the liquid-crystal display apparatus is used for displaying a video signal supplied thereto or generated therein as an image or a video. The following description explains concrete implementations of the electronic instrument to which the present invention is applied.

Figure 7:
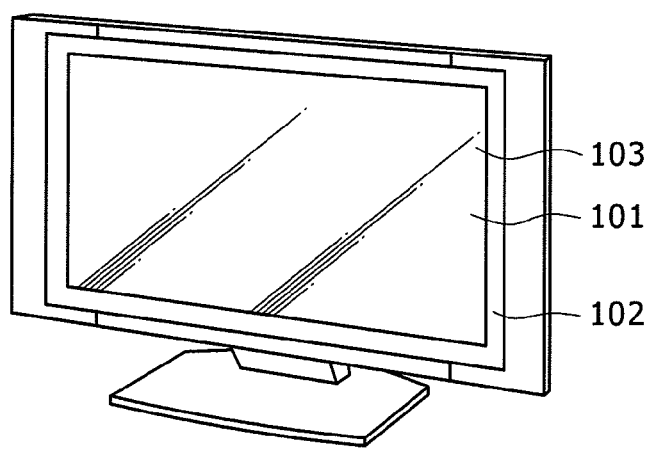
FIG. 7 is a diagram showing a squint view of the external appearance of a TV set to which an embodiment of the present invention is applied.

FIG. 7 is a diagram showing a squint view of the external appearance of a TV set to which an embodiment of the present invention is applied. The TV set serving as a typical implementation of the electronic instrument to which the present invention is applied employs a front panel 102 and a video display screen section 101 which is typically a filter glass plate 103. The TV set is constructed by employing the liquid-crystal display apparatus provided by the present invention in the TV set as the video display screen section 101.

Figure 8A:
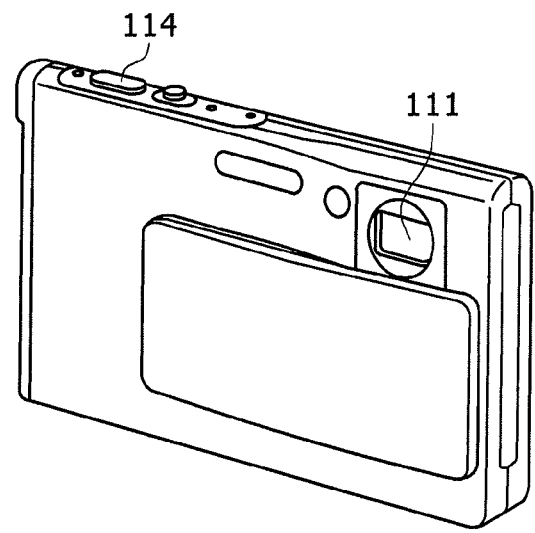
FIGS. 8A and 8B show squint views of the external appearance of a digital camera to which an embodiment of the present invention is applied.
Figure 8B:
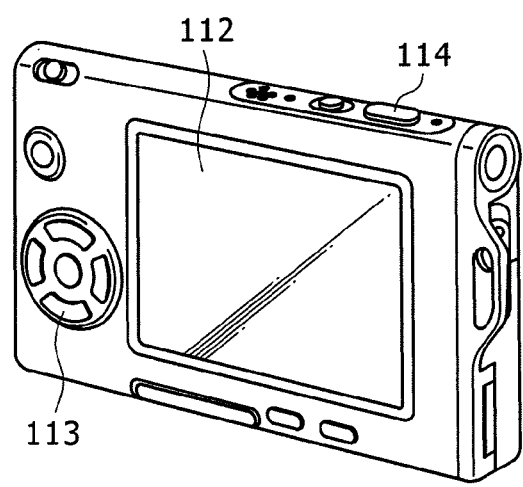

FIGS. 8A and 8B show squint views of the external appearance of a digital camera to which an embodiment of the present invention is applied. To be more specific, FIG. 8A is a diagram showing a squint view of the external appearance of the digital camera seen from a position on the front side of the digital camera whereas FIG. 8B is a diagram showing a squint view of the external appearance of the digital camera seen from a position on the rear side of the digital camera. The digital camera serving as a typical implementation of the electronic instrument to which an embodiment of the present invention is applied employs a light emitting section 111 for generating a flash, a display section 112, a menu switch 113 and a shutter button 114. The digital camera is constructed by employing the liquid-crystal display apparatus provided by the present invention in the digital camera as the display section 123.

Figure 9:
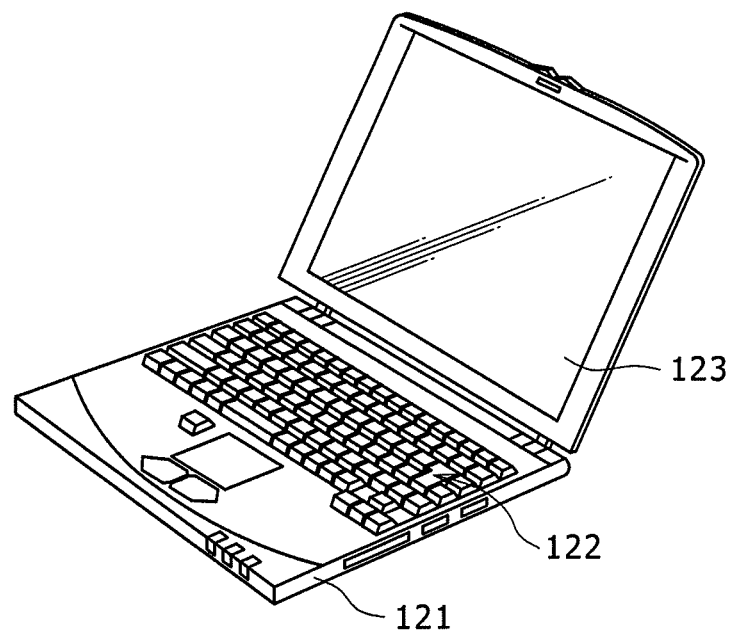
FIG. 9 is a diagram showing a squint view of the external appearance of a notebook personal computer to which an embodiment of the present invention is applied.

FIG. 9 is a diagram showing a squint view of the external appearance of a notebook personal computer to which an embodiment of the present invention is applied. The notebook personal computer serving as a typical implementation of the electronic instrument to which the present invention is applied employs a main body 121 including a keyboard 122 to be operated by the user for entering characters and a display section 123 for displaying an image. The notebook personal computer is constructed by employing the liquid-crystal display apparatus provided by the present invention in the personal computer as the display section 112.

Figure 10:
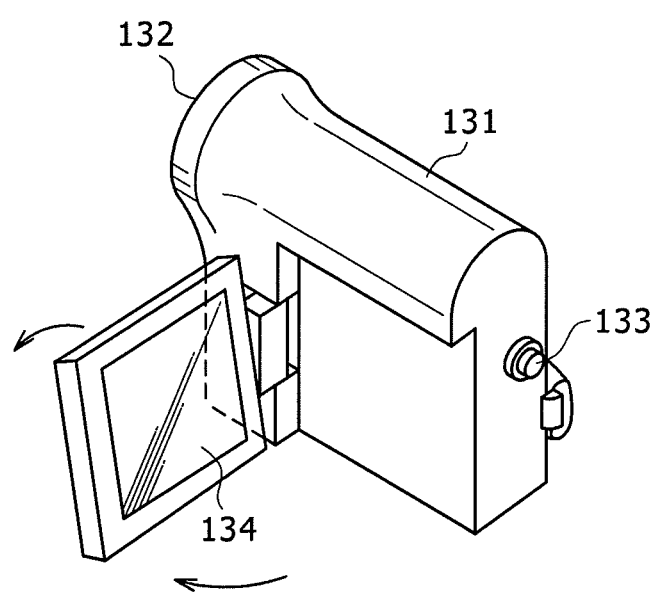
FIG. 10 is a diagram showing a squint view of the external appearance of a video camera to which an embodiment of the present invention is applied.

FIG. 10 is a diagram showing a squint view of the external appearance of a video camera to which the present invention is applied. The video camera serving as a typical implementation of the electronic instrument to which the present invention is applied employs a main body 131, a photographing lens 132, a start/stop switch 133 and a display section 134. Provided on the front face of the video camera, the photographing lens 132 oriented forward is a lens for taking a picture of a subject of photographing. The start/stop switch 133 is a switch to be operated by the user to start or stop a photographing operation. The video camera is constructed by employing the liquid-crystal display apparatus provided by the embodiment of the present invention in the personal computer as the display section 134.

FIGS. 11A to 11E show the external appearances of a portable terminal such as a cellular phone to which an embodiment of the present invention is applied. To be more specific, FIG. 11A is a diagram showing the front view of the cellular phone in a state of being already opened. FIG. 11B is a diagram showing a side of the cellular phone in a state of being already opened. FIG. 11C is a diagram showing the front view of the cellular phone in a state of being already closed. FIG. 11D is a diagram showing the left side of the cellular phone in a state of being already closed. FIG. 11E is a diagram showing the right side of the cellular phone in a state of being already closed. FIG. 11F is a diagram showing the top view of the cellular phone in a state of being already closed. FIG. 11G is a diagram showing the bottom view of the cellular phone in a state of being already closed. The cellular phone serving as a typical implementation of the electronic instrument to which the embodiment of the present invention is applied employs an upper case 141, a lower case 142, a link section 143 which is a hinge, a display section 144, a display sub-section 145, a picture light 146 and a camera 147. The portable terminal is constructed by employing the liquid-crystal display apparatus provided by the embodiment of the present invention in the personal computer as the display section 144 and/or the display sub-section 145.

What is claimed is:

1. A display apparatus comprising a first substrate having a plurality of pixels comprised of a plurality of pixel electrodes, a second substrate placed to face said first substrate and a liquid-crystal layer sandwiched by said first and second substrates wherein:
    one of said first and second substrates has color filters formed thereon, each provided for one of a plurality of different colors as a color filter associated with one of said pixel electrodes;
    each of said pixel electrodes provided for one of said different colors has a pixel boundary area which varies from color to color; and
    a ratio of a pixel electrode conductive area of any particular one of said pixel electrodes to the pixel boundary area of said pixel that includes said particular pixel electrode varies from color to color and wherein:
    each of said pixel electrodes comprises a plurality of parallel electrode members and a bridge member for connecting said electrode members to each other; and a conductive area of said bridge member included for any specific one of said pixel electrodes is different such that overall pixel electrode conductive areas for each of the individual pixel electrodes corresponding to the color filters are substantially equal to each other.

2. The display apparatus according to claim 1 wherein:
a common electrode is created on said first substrate, sandwiching an insulation film between said common electrode and said pixel electrodes; and
any particular one of said pixels each provided for one of said different colors comprises a thin-film transistor connected to said pixel electrode included in said particular pixel as well as a signal storage capacitor included in said particular pixel and said common electrode.

3. The display apparatus according to claim 2 wherein any specific one of said pixel electrodes is configured so that said signal storage capacitor included in the same pixel as said specific pixel electrode has a storage capacitance which is approximately uniform for all of said pixels each provided for one of said different colors.

4. The display apparatus according to claim 2 wherein any specific one of said pixel electrodes is configured to have an electrode area which is approximately uniform for all of said pixels each provided for one of said different colors.

5. The display apparatus according to claim 1 wherein said bridge members are covered by a light shielding film.

6. The display apparatus according to claim 1 wherein:
said first and second substrates sandwich spacers besides said liquid-crystal layer; and
each of said spacers is placed on one of said bridge members.

7. The display apparatus according to claim 1 wherein the pixel boundary area of said pixel having a longest wavelength among said pixels each provided for one of said different colors is smallest among said pixels each provided for one of said different colors.

8. The display apparatus according to claim 7 wherein said pixel having a longest wavelength among said pixels each provided for one of said different colors has a largest ratio of the pixel electrode conductive area of said pixel electrode to the pixel boundary area of said pixel among said pixels each provided for one of said different colors.

9. The display apparatus according to claim 1 wherein:
on an outer side of one of said first and second substrates, there is provided a backlight having a strong intensity of light generated in a wavelength area of the blue color in comparison with wavelength areas of colors other than the blue color; and
said pixel provided for the blue color has a smallest pixel boundary area area among said pixels each provided for one of said different colors.

10. The display apparatus according to claim 9 wherein said pixel provided for the green color has a largest pixel boundary area among said pixels each provided for one of said different colors.

11. The display apparatus according to claim 1 wherein a pitch of the parallel electrode members for each of the pixel electrodes is substantially equal.

12. The display apparatus according to claim 1 wherein a width of the parallel electrode members for each of the pixel electrodes is substantially equal.

13. The display apparatus according to claim 1 wherein both a width and pitch of the parallel electrode members for each of the pixel electrodes is substantially constant for all electrodes.

* * * * *